I. A. BOEDDENER.
OVEN.
APPLICATION FILED NOV. 6, 1907.

903,834.

Patented Nov. 17, 1908.

2 SHEETS—SHEET 1.

Witnesses:
Ira D. Perry
Arthur H. Boettcher

Inventor
Ida A. Boeddener
By Janes, Addington & Ames
Attorneys.

I. A. BOEDDENER.
OVEN.
APPLICATION FILED NOV. 6, 1907.
903,834.
Patented Nov. 17, 1908.
2 SHEETS—SHEET 2.
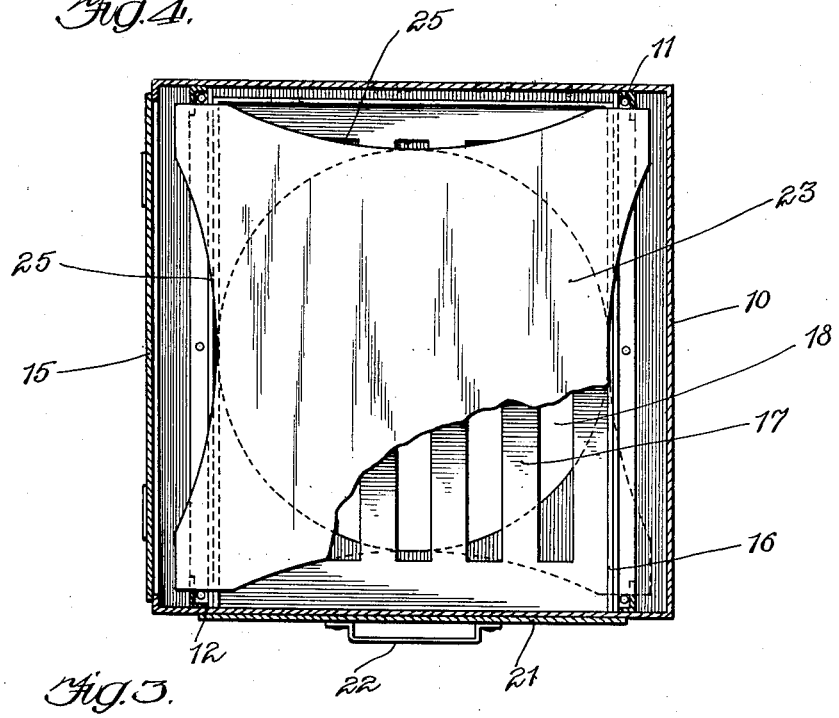
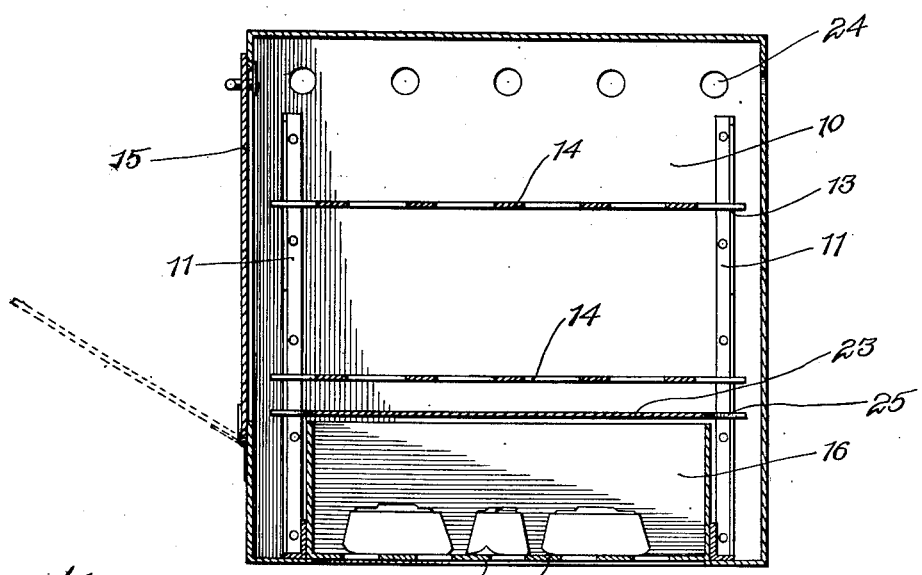
Witnesses:
Inventor:
Ida A. Boeddener
By Jones, Addington & Ames
Attorneys.

UNITED STATES PATENT OFFICE.

IDA A. BOEDDENER, OF CHICAGO, ILLINOIS.

OVEN.

No. 903,834.      Specification of Letters Patent.      Patented Nov. 17, 1908.

Application filed November 6, 1907. Serial No. 400,970.

*To all whom it may concern:*

Be it known that I, IDA A. BOEDDENER, a citizen of the United States, residing at Chicago, in the county of Cook and State of Illinois, have invented new and useful Improvements in Ovens, of which the following is a full, clear, concise, and exact description, reference being had to the accompanying drawing, forming a part of this specification.

My invention relates to ovens and contemplates improvements in that class of ovens which are commonly known as portable ovens and are adapted, when in use, to be disposed over a suitable heating device, ordinarily that type of heating device which does not include an oven, such as the ordinary gas or gasolene stove consisting merely of a supporting stand and one or more burners.

By the use of my invention I provide a device of the class described in which the heat is utilized for a double purpose, that is, a given amount of fuel may be made to do the work heretofore done by a much greater quantity thereof, thus economizing greatly in the consumption of the gas or other fuel used. The manner in which my invention may be employed to secure these advantages can be aptly illustrated by the following instance of its practical use: While used as an oven for cooking purposes, the oven embodying my invention may accommodate smoothing irons, which are heated without interfering in any way with the other purpose for which the oven is employed.

It is an important feature of my invention that the heat yielded by a given amount of fuel is not less effective upon the smoothing irons when employed also for cooking purposes than it would be if it were used for this purpose only, and it is not less effective in cooking because of its being employed at the same time for heating the smoothing irons. While the principal object of my invention is, as thus pointed out, economy in fuel consumption, I secure other advantages which will be hereinafter specifically emphasized.

I have illustrated the device of my invention in the accompanying drawings, in which—

Figure 1:
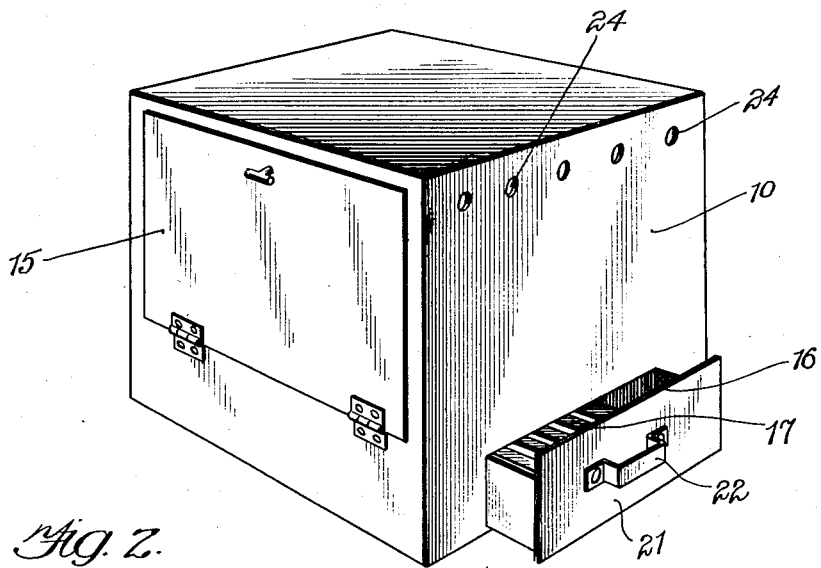
Figure 2:
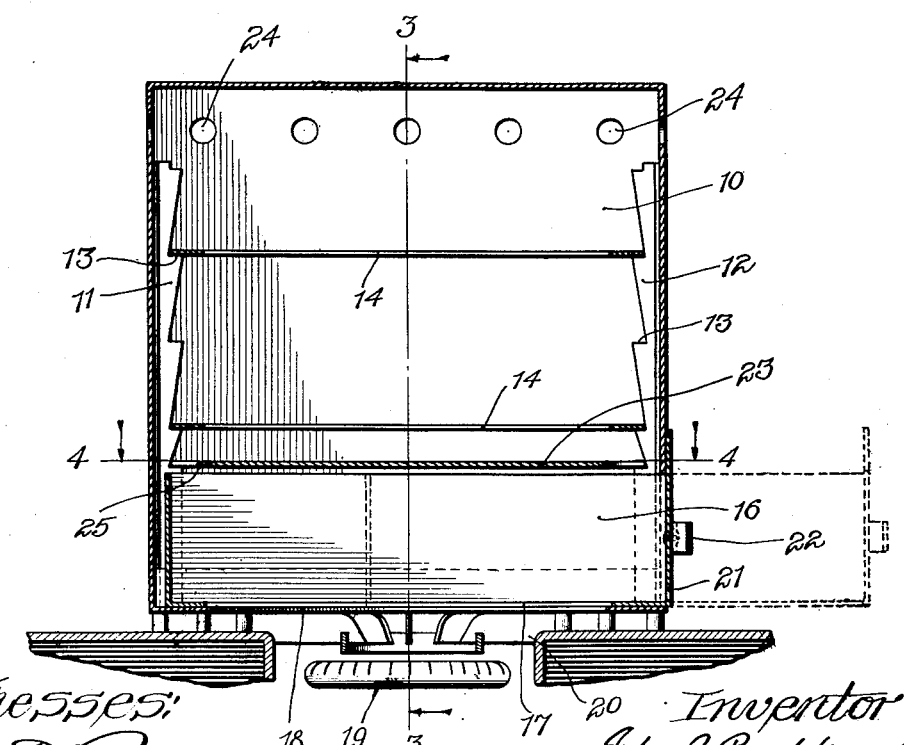

Figure 1 is a perspective view of the device; Fig. 2 is a cross sectional view thereof; Fig. 3 is a cross sectional view on the line 3—3 of Fig. 2 looking in the direction indicated by the arrows; and Fig. 4 is a sectional view on the line 4—4 of Fig. 2 looking in the direction indicated by the arrows.

The same reference characters are applied to the same parts throughout the various figures.

I have illustrated at 10 the main body portion or casing of the device which, as is ordinary in portable ovens, is box-like and is adapted to be disposed over a suitable heating device, such as the ordinary gas stove as hereinbefore stated. Upon the interior of the casing is mounted the upright supporting members 11 and 12 which are provided with shoulders 13, 13, upon which rest suitable shelves 14 which are grated as is usual in such devices. A door 15 admits of access to these shelves for obvious purposes. The lower part of the device is adapted to accommodate articles to be heated by the direct or close application thereto of the flame, such as smoothing irons and the like. As an efficient construction for securing this result I have shown disposed in the bottom of the casing 10 a sliding drawer 16, the bottom 17 of which is in the form of a grid. The bottom wall of the casing 10 is provided with the opening 18, and this opening, when the device is in use, will be disposed directly over the flame of the burner 19 of the gas stove 20, as clearly shown in Fig. 2. The drawer 16 is provided with the front piece 21 which is adapted to close the opening into which the drawer slides, when the same is closed to assist in confining the heat within the oven. A handle 22 is provided upon the drawer to facilitate the manipulation thereof.

It is to be understood that the articles which are disposed in the lower part of the oven are those articles which are most satisfactorily heated by direct or close application of the flame thereto, while those articles which should be affected by heat radiating from the heated walls of an inclosure are placed in the oven portion above. Thus smoothing irons, which are satisfactorily and most quickly heated by direct or close application to a flame, may be disposed upon the grid 17, thereby retaining all the advantages incident to the use of a flame for that purpose only, and articles of food to be baked may be placed upon the shelves 14. I have found that the efficiency of the oven is increased when it is separated into two compartments, the above for the reception of articles to be baked and the lower for the reception of articles to be heated by direct or close application to the flame. I have, therefore, provided a partition 23 suitably disposed above the drawer 16 and it is apparent that this partition further assists in accomplishing the result which I desire to obtain, as it forms a radiating wall to reflect the heat. The presence of this partition increases the efficiency of the device by effecting the rising of the temperature and also accomplishes more even distribution of the heat in the upper compartment by increasing the radiating wall area.

Not only is the cooking in the upper compartment of the oven carried on precisely as if the flame were employed for that purpose only, but the irons are heated more quickly than if they were disposed over an open flame. Suitable draft openings 24, 24 may be provided in the walls of the device, near the top thereof, and the partition 23 may be cut out slightly as at 25, 25 to provide for proper circulation of air in the oven as is desirable when articles of food are being cooked therein.

When smoothing irons or the like are to be placed on the grid 17, the drawer 16 will be withdrawn for this purpose, without interfering with the progress of the baking in the upper compartment. The drawer will then be thrust back into place when the irons will occupy the proper position over the burner to be heated thereby. When an iron is to be removed for use, this drawer will be again withdrawn, and the iron may be grasped and lifted from the grid without inconvenience or danger of contact with the flame.

I claim as new and desire to secure by Letters Patent:

1. An oven comprising a casing having an open bottom and access openings in its vertical walls, means for closing each of said openings independently of the other, a partition disposed between said openings dividing said casing into upper and lower compartments and being spaced from said casing to provide passage between said compartments, a box drawer slidably mounted in said lower compartment having a reticulated bottom forming the bottom of said casing and arranged to be withdrawn through the lower opening, the vertical walls of said drawer extending upwardly to said partition, and a grated shelf disposed in said upper compartment.

2. An oven comprising a casing having an open bottom, a partition dividing said casing into upper and lower compartments, said partition being spaced from said casing to provide passage between said compartments, a reticulated shelf disposed in said upper compartment, said casing having an access opening above said partition and a separate access opening below said partition, a box drawer slidably mounted in said lower compartment having a reticulated bottom forming the bottom of said casing and arranged to be withdrawn through the lower access opening, the vertical walls of said drawer extending upwardly to said partition, means for closing the upper access opening, and separate means for closing said lower access opening when said drawer is in position over the opening in the bottom wall.

3. An oven comprising a casing having an open bottom and access openings in its vertical walls, a partition disposed between said access openings dividing said casing into upper and lower compartments and being spaced from said casing to provide passage between said compartments, a reticulated shelf disposed in said upper compartment, and a box drawer with a reticulated bottom forming the bottom of said casing slidably mounted in said lower compartment and arranged to be withdrawn through the lower access opening, the vertical walls of said box drawer extending upwardly to said partition.

4. An oven comprising a casing having an open bottom and access openings in its vertical walls, a partition disposed between said access openings dividing said casing into upper and lower compartments and being spaced from said casing to provide passage between said compartments, a reticulated shelf disposed in said upper compartment, and a box drawer with a reticulated bottom forming the bottom of said casing slidably mounted in said lower compartment and arranged to be withdrawn through the lower access opening, the vertical walls of said box drawer extending upwardly to said partition, the front of said box drawer forming the means for closing said lower access opening.

In witness whereof, I have hereunto subscribed my name in the presence of two witnesses.

IDA A. BOEDDENER.

Witnesses:
M. L. FARRAR,
ARTHUR H. BOETTCHER.